(12) United States Patent
Hill

(10) Patent No.: US 6,369,483 B1
(45) Date of Patent: Apr. 9, 2002

(54) ELECTRIC MACHINE WITH A SINGLE POLE WINDING

(76) Inventor: Wolfgang Hill, D-76135, Karlsruhe (DE)

( * ) Notice: Subject to any disclaimer, the term of this patent is extended or adjusted under 35 U.S.C. 154(b) by 0 days.

(21) Appl. No.: 09/299,756

(22) Filed: Apr. 27, 1999

Related U.S. Application Data

(63) Continuation of application No. PCT/DE97/02457, filed on Oct. 15, 1997.

(51) Int. Cl.$^7$ ............................. H02K 29/00; H02K 1/14
(52) U.S. Cl. ........................................ 310/216; 310/254
(58) Field of Search ........................ 310/42, 216, 271, 310/156, 254, 261, 269, 49 R; 29/596, 597, 598

(56) References Cited

U.S. PATENT DOCUMENTS

| | | | |
|---|---|---|---|
| 2,870,357 A | * | 1/1959 | Vandenberg et al. ......... 310/218 |
| 3,851,830 A | * | 12/1974 | Barthalon .................... 336/208 |
| 4,219,748 A | * | 8/1980 | Sakaguchi et al. ............ 310/71 |
| 4,241,324 A | * | 12/1980 | Douglass et al. ........... 336/217 |
| 4,745,312 A | * | 5/1988 | Nagasaka .................. 310/49 R |
| 5,331,245 A | * | 7/1994 | Burgbacher et al. ........ 310/186 |
| 5,801,463 A | * | 9/1998 | Suzuki et al. ................. 310/51 |

FOREIGN PATENT DOCUMENTS

JP 3-78458 * 3/1991

* cited by examiner

Primary Examiner—Tran Nguyen

(57) ABSTRACT

Electric machines with a radial air gap field, but in particular low power EC external rotors, have advantageously individually spooled poles. The trapezoidal cross section of the slot and small slot openings towards the air gap make the realization of a compact winding difficult. In accordance with the invention, the body of the electric machine which form the individual poles is assembled from soft magnetic segments. The segments are preferably made of axially stacked sheet metal that have indentations on the edges forming the wall of the slot. The indentations enables the conductor wire to be guided in a precise manner during winding of the individual poles. At the air gap, pole shoes cover almost the entire perimeter and at the opposite end, they form adjacent pole segments, preferably with recesses, into which retention pins are axially inserted after mounting to ensure radial fixation. In multi-phase machines, spooled T-segments and non-spooled X-segments alternate in direction of the slot width with the X-segment possessing a pole surface that is fractionally enlarged in accordance with the number of phases. The invention enables highly efficient electric drive units to be produced at low cost.

14 Claims, 4 Drawing Sheets

ELECTRIC MACHINE WITH A SINGLE POLE WINDING

This is a continuation of PCT/DE97/02457, filed on Oct. 15, 1997 with priority of the German application 196 43 561.7, filed on Oct. 22, 1996, now abandoned.

BACKGROUND OF THE INVENTION

1. Field of the Invention

The invention concerns an electric machine with a single pole winding and a soft magnetic body that is composed of pole segments, as well as a process for its production. Electric machines, in particular electrically commutated (EC) [EC] external rotors of small capacity show advantageously individually spooled poles. Single pole windings avoid overlapping of conductors of different phases and, therefore, can be spooled very compactly.

2. Description of Prior Art

In DE/AS 1 033 769, a rotor for a dynamo-electric machine is described in which its individual poles are attached to the core by dovetail projections.

From DE 42 13 377 A1, a brushless DC motor with internal rotor is known in which the stator is composed of L-shaped segments, said segments being inserted into a winding, said winding being spooled around a star-shaped body made of synthetic material.

In DE 44 36 257 A1, a salient pole rotor of a dynamo-electric machine is described that is made by pushing and clamping together two claw-shaped halves. The absence of every other pole in the rotor halves simplifies the direct spooling of the exciter poles which are executed in a layered sheet technique. All poles are symmetrically distributed over the circumference and identical.

Further, from DE 40 04 019 A1, stacked coils are known which, in spite of the slot width diminishing with the radius, make a high filling factor of the slot possible. The production of these stacked coils is very costly, and in order to mount said coils, open grooves are required which in turn cause pole face losses or expenditures for the production and assembly of soft magnetic groove retainer keys.

The objective of the present invention is, therefore, to advance an electric machine with a single pole winding and a process for its production in such a manner that, at a given size, losses are decreased and, at the same time, simple cost efficient production is possible.

SUMMARY OF THE INVENTION

According to the invention, this objective is achieved in accordance with the characteristics in the disclosure.

In accordance with the invention, the body constituting the individual poles is composed of soft magnetic segments which in turn consist of sheets that are stacked preferably in axial direction and that have grooves on those surfaces that constitute the wall of the slot, said grooves facilitating the exact tracking of the conductor wire when winding the exciter coils.

The first approach to achieve the objective is, therefore, to obtain a defined position of the windings by structuring the surface of the pole core and applying only thin insulation layers between the conductors and the pole core. This allows for good heat dissipation of the winding losses into the pole core and a high space factor in the slots.

In addition, round or profile wire spooled free of overlap in defined layers can be compacted into the desired shape by subsequent pressing. Beginning from an initial coil layer defined arranged by the grooves of the pole core, a precisely working winding machine can produce a reproducible coil surface, thereby creating the preconditions for the subsequent compaction and space saving assembly of the machine.

Complementary or alternatively, the second approach to achieving the objective of the invention, as described in claim 5, also allows good space utilization in multi-phase machines with single pole winding and, concurrently, results in a decrease of winding losses and of production costs. Here, the preferably annular soft magnetic body is composed of two segment designs that are alternately arranged in circumferential direction.

The pole pitch of the first segment design—hereinafter referred to as T-segment—corresponds approximately to the pole pitch of the body that is arranged oppositely at the air gap. The pole pitch of the second segment design—hereinafter referred to as X-segment—on the other hand, is smaller or larger by the fraction of the pole pitch that corresponds to the number of phases. The X-segment realizes the phase offset at the circumference of the successive T-segments and at the same time ensures a magnetically homogeneous air gap surface of the soft magnetic body. While the T-segment constitutes the coil core, the X-segment fills the space between two adjacent conductor coils and is preferably designed in such a manner that voids which increase heat resistance are avoided.

The coils may be spooled as wire coils preferably directly onto the T-segment or they may be prefabricated in a device as profile wire coils hardened by a bonding layer. The T-segment conducts magnetic flux predominantly in direction of the slot depth and may, therefore, be advantageously manufactured of grain-oriented material. On the other hand, the X-segment conducts flux also in direction of the slot width and, therefore, consists preferably of low-loss electric sheet without predominant grain direction.

BRIEF DESCRIPTION OF THE DRAWINGS

The drawings display advantageous embodiments of the invention.

DETAILED DESCRIPTION OF THE PREFERRED EMBODIMENT

Figure 1:
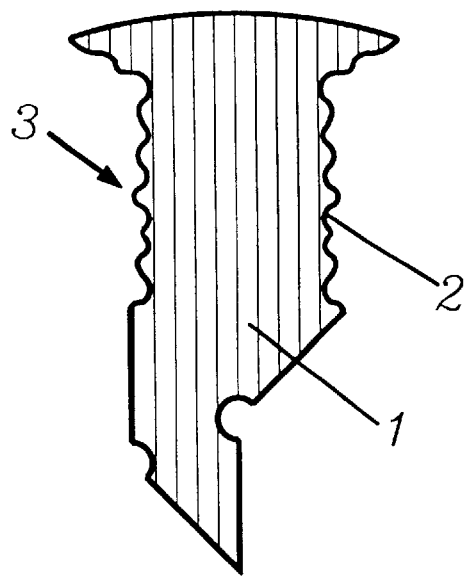
FIG. 1 shows the punched blank of a pole segment.

The punched blank of a pole segment (1) depicted in FIG. 1 shows the grooves (2) in the edges facing the slot area that are typical for the first approach to achieving the objective of this invention. The grooves of the slot surface (3) serve the tracking of the conductor wires (4). The surface is structured in such a way that the first layer of the pole winding results in an optimal base position for the generation of a trapezoidal coil (5).

Complementing this tracking of the innermost winding layer are front elements (6) made of a synthetic material that are glued to the pole segments (1) and that also have grooves (7) in order to track the conductor wire in a defined manner.

Figure 2:
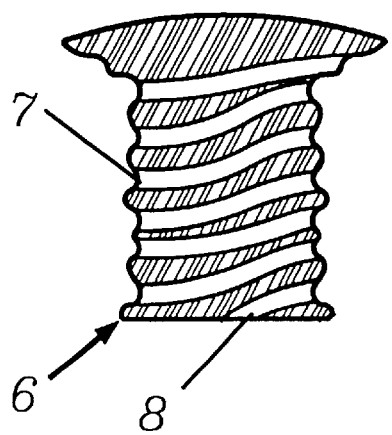
FIG. 2 shows the top view onto a front element.

In FIG. 2, one of the two appurtenant front elements (6) is depicted in which the infeed of the wire (8) is visible on the bottom and the remaining grooves (7) enforce the defined tracking of the wire (4). The opposite front element leads the wire at the same radial height around the front of the pole.

By means of the grooves (2, 7) that surround the pole segment (1) in a screw-like manner, the first layer of the single pole coil (5) may be spooled exactly and tightly directly onto the pole segment (1). The width and depth of the grooves (2, 7) may be executed differently, so that the wires in a layer show different distances to each other.

Figure 3:
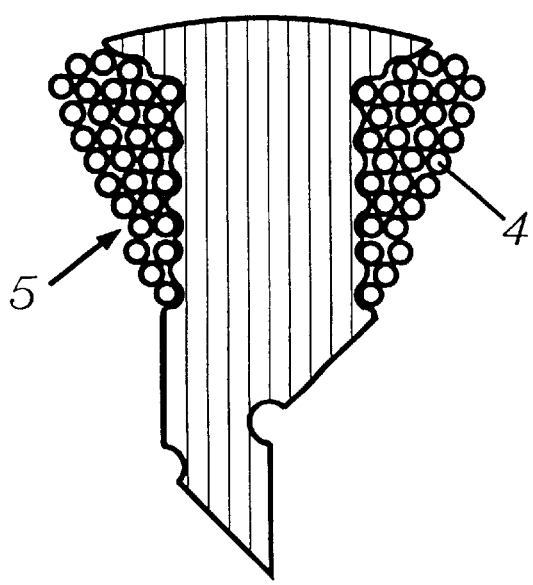
FIG. 3 shows the cross cut of a spooled pole element prior to compaction.

FIG. 3 shows a cut through the pole segment (1) immediately after being spooled where a relatively thick round wire (4) is placed in a strictly defined pattern.

Figure 4:
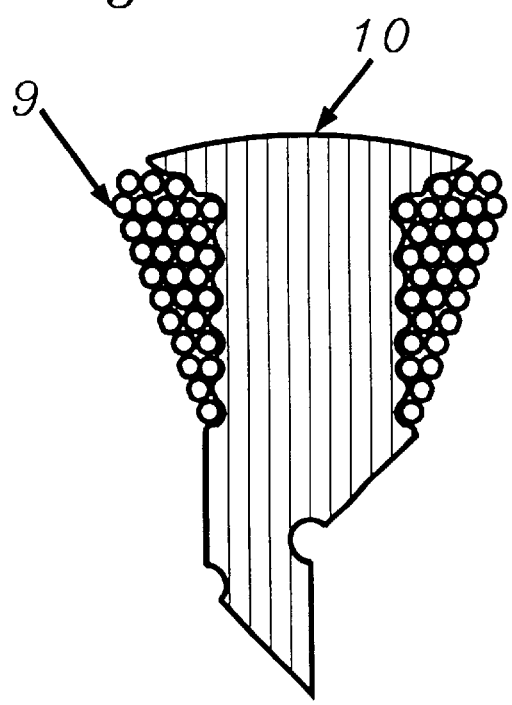
FIG. 4 shows the cross cut of a spooled pole element after compaction.

FIG. 4 shows the spooled pole segment (1) from FIG. 3 after the coil (5) has been compressed in a press to the desired outer dimensions. Here, the round wires (4) are being deformed in order to obtain a smooth surface (9). In addition to the exact placement of the wire, an additional increase in the slot space factor is achieved by pressing, causing a reduction of winding losses with the design size remaining the same. The pole segments are preferably made of grain oriented electric sheet.

Figure 5:
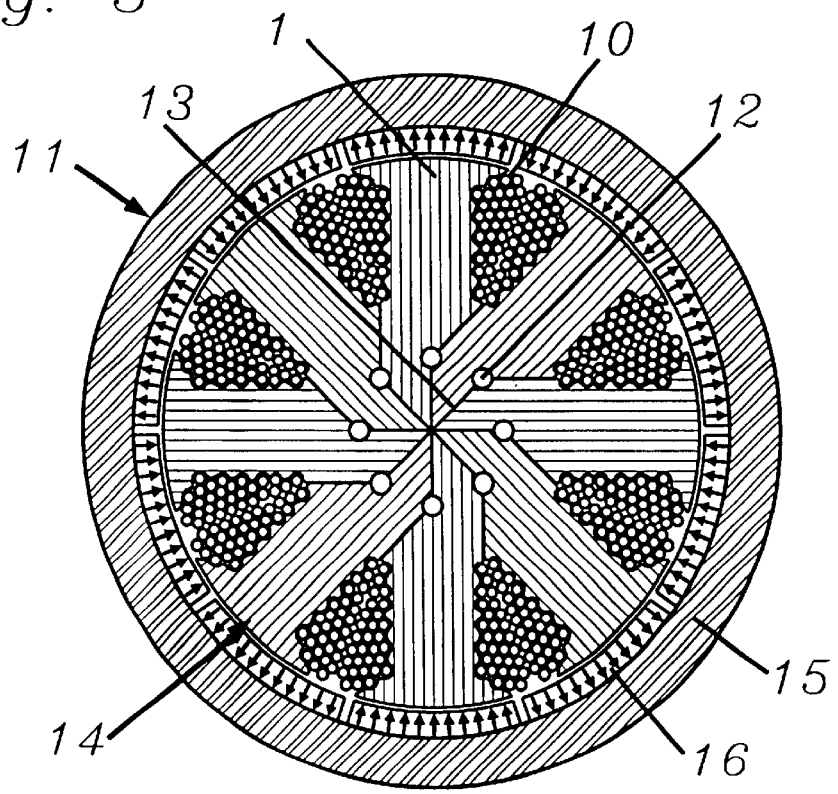
FIG. 5 shows the cross cut of a 10-pole, 4-phase EC external rotor.

The electric poles (10) that have been prefabricated in accordance with FIGS. 1–4 are structural parts of a 4-phase, 10-pole EC external rotor (11), the cross cut of which is shown in FIG. 5.

The pole segments (1) utilize the space to the center of the axis for conduction of magnetic flux. After assembly, thin locking pins are axially inserted into the recesses (12) at the locations of the joints (13) of the pole segments and thereby ensure stable cohesion of the segmented stator (14). The rotating housing (15) serves concurrently as magnetic yoke for the permanent magnets (16).

Figure 6:
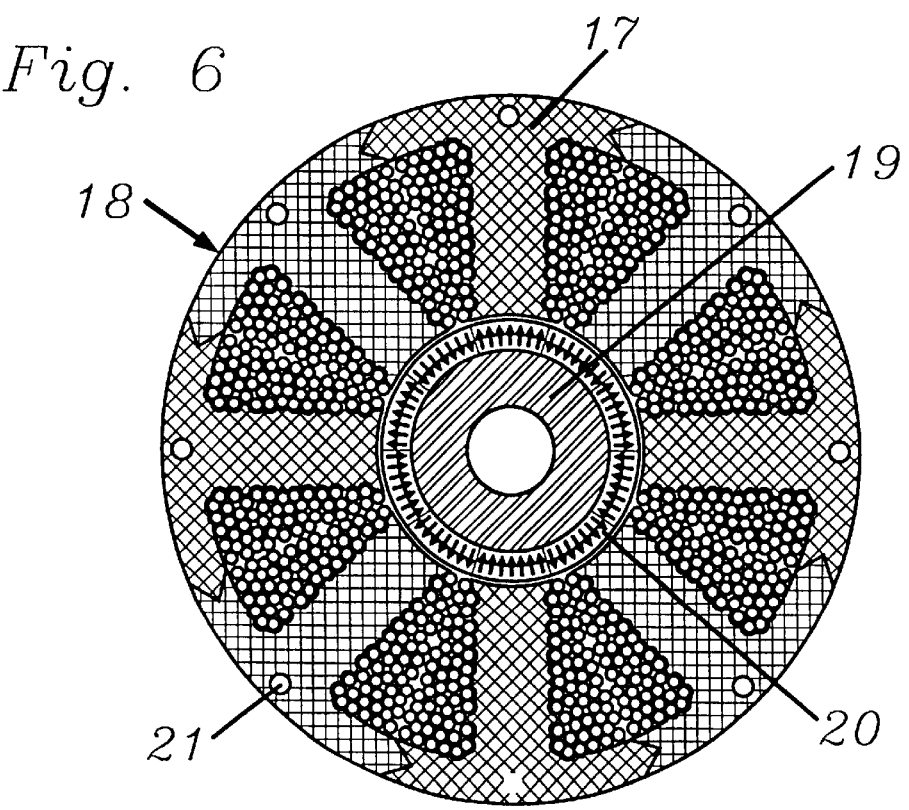
FIG. 6 shows the cross cut of a 10-pole, 4-phase EC internal rotor.

Alternatively, the prefabricated pole segments (17) can also be inserted radially outside the air gap. FIG. 6 shows an example of the cross cut of a 4-phase, 10-pole EC internal rotor (18) in which a radially multi-pole magnetized permanent magnet ring (20) is glued onto the hollow silicon iron shaft (19). For high rotary frequency, the pole segments (17) are punched from high frequency sheet and show a magnetic flux density that approximates the magnetic flux density in the annular magnets (20) (e.g. 1T). Only the holes (21) in the yoke area for the retention pins are areas in the cross cut drawing that are not electro-magnetically utilized.

Figure 7:
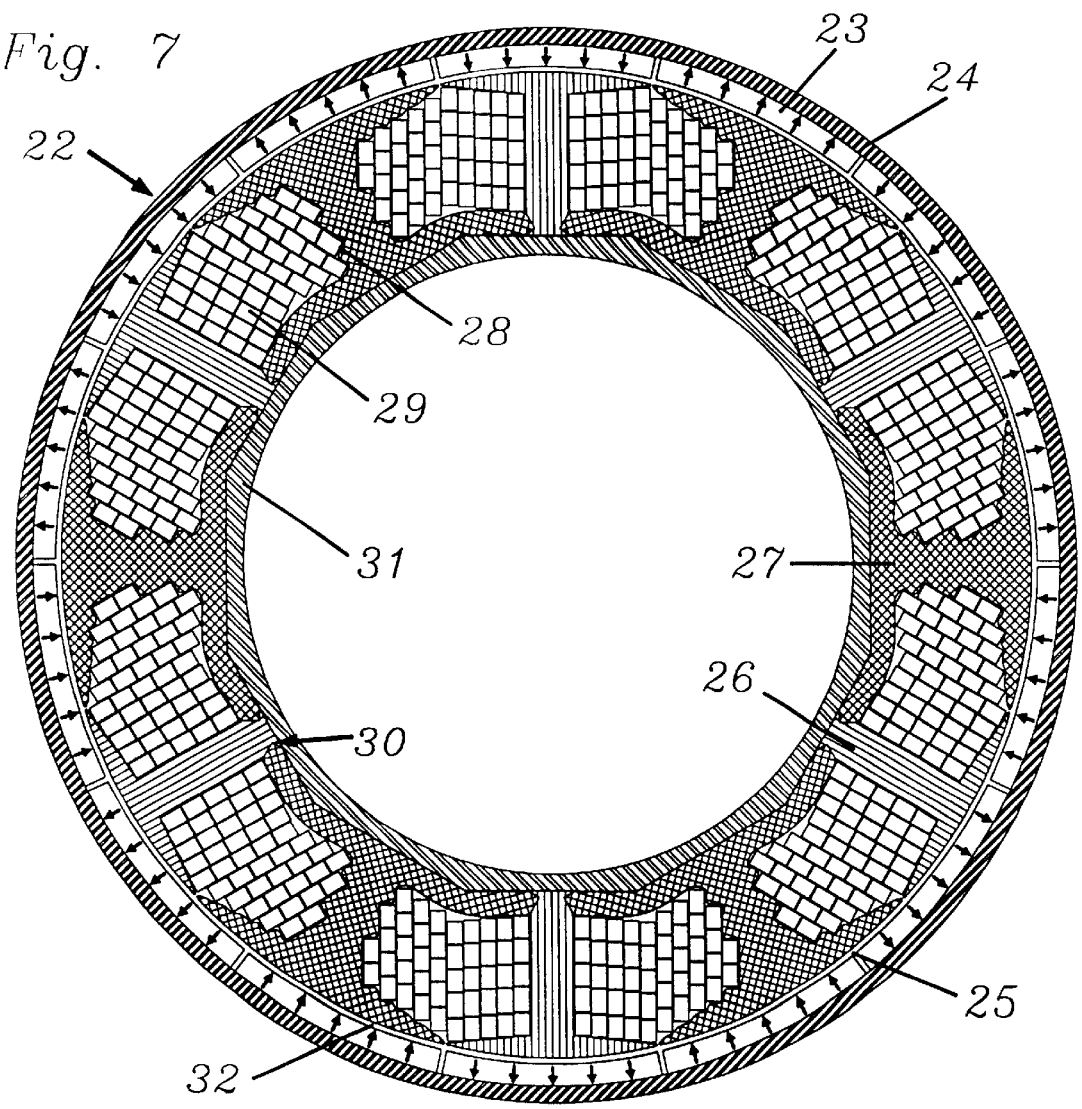
FIG. 7 shows the cross section of a 14-pole, 3-phase EC external rotor.

FIG. 7 shows an annular 3-phase EC machine (22) in accordance with the second approach to achieving the objective the invention. Opposite the fourteen identical permanent magnets (23) that are glued evenly distributed into the rotor yoke (24) lie, at the air gap (25), twelve pole segments—six T-segments (26) and 6 X-segments (27) each. The pole segments (26, 27) cover nearly the entire surface at the air gap (25). The T-segments (26), shown in striped hatching, consist preferably of transformer sheet and are inserted in the prefabricated profile wire coils (29). The X-segments (27), punched from dynamo sheet, are shown in cross hatching. Their larger tangential width provides the phase offset, and at the slot surfaces (28) they are designed in such a manner that during assembly the profile wire coils (29) are pressed into a defined position, and due to the close fit of the surfaces ensure good heat dissipation as well as low noise.

Figure 8:
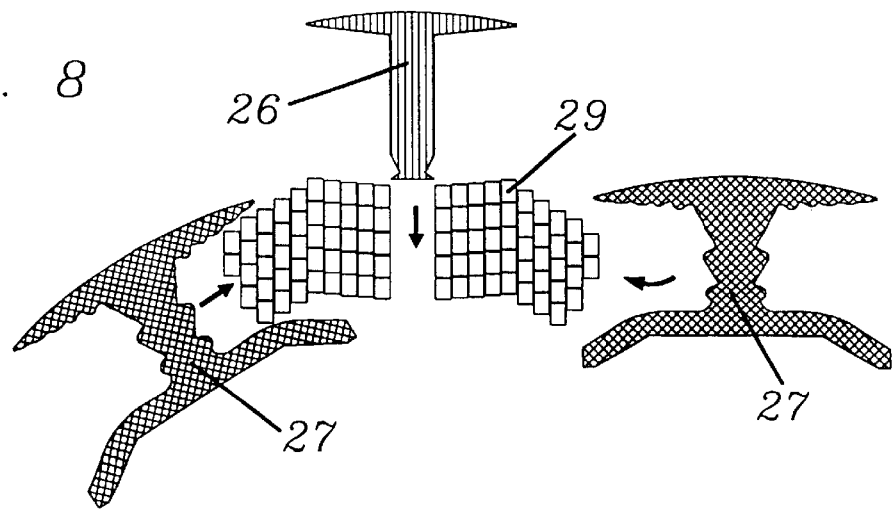
FIG. 8 shows the components from FIG. 7 in the process of being assembled.

After assembly of the pole segments (26, 27) and the profile wire coils (29) as shown in FIG. 8, the stator ring (30) is placed over a polygonal carrier tube (31) and a thin bandage (32) of fiber-reinforced ribbon is applied. After impregnation the stator is sufficiently stable and can be exposed to the magnetic forces of the rotor.

Figure 9:
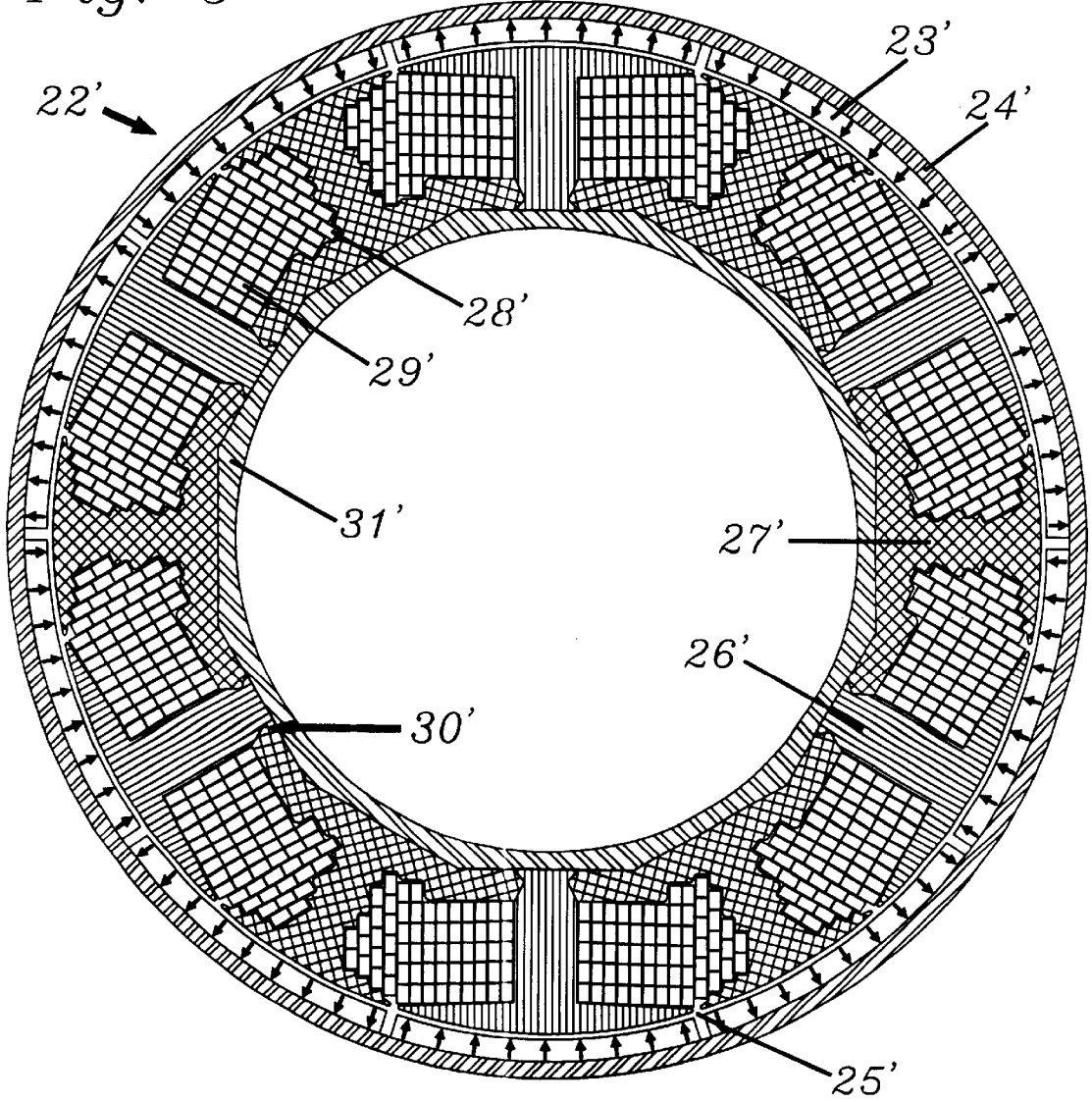
FIG. 9 shows the cross cut of a 10-pole, 3-phase EC external rotor.

Alternatively to FIG. 7, FIG. 9 shows an annular 3-phase EC-machine (22') with X-segments (27') covering only two thirds of the rotor pole pitches at the air gap (25'), thereby having 10 rotor poles lying opposite 12 stator poles (26', 27'). Said rotor poles consist of identical permanent magnets (23') that are glued evenly distributed into the rotor yoke (24'). The T-segments (26') are inserted into the prefabricated wire coils (29'), the smaller tangential width of the X-segments (27') provides the phase offset, and the slot surface (28') ensures good heat dissipation. The stator ring (30') is placed over a polygonal carrier tube (31'). The invention is also applicable to internal rotors, axial flux machines, and linear motors, as well as to machines with electric excitation and to reluctance machines.

What is claimed is:

1. Multiphase electric machine with a number of phases, a single pole winding, winding overhangs, at least one air gap between a soft magnetic body that is composed of pole segments, and a body oppositely arranged with poles, wherein adjacent pole segments are executed with a different pole pitch, and only one of two adjacent pole segments is enclosed by a coil, said pole pitch of one of said two adjacent segments is approximately equal to the pole pitch of said body oppositely arranged, and the pole pitch of the other of said two adjacent pole segments is smaller by a fraction of the pole pitch of said body oppositely arranged, said fraction of the pole pitch corresponding to the reciprocal of said number of phases.

2. Multiphase electric machine with a single pole winding in accordance with claim 1, wherein the pole pitch of said pole segment which is greater by said fraction corresponds to the pole pitch of the oppositely arranged body.

3. Multiphase electric machine with a single pole winding in accordance with claim 1, wherein the pole pitch of said pole segments that are enclosed by a coil is corresponding approximately to said pole pitch of said body oppositely arranged at said air gap and said coil consists of profile wire that is hardened by a bonding layer.

4. Multiphase electric machine with a single pole winding in accordance with claim 1, wherein said pole segments that are enclosed by a coil are composed of grain oriented sheet and form a surface at said air gap that corresponds to the surface of said poles of said oppositely arranged body.

5. Multiphase electric machine with a single pole winding in accordance with claim 1, wherein said soft magnetic body has a yoke and said pole segments that deviate from said pole pitch of said body arranged oppositely from said air gap occupy the space between two adjacent coils and form a large part of said yoke.

6. Process for the production of a multiphase electric machine with a single pole winding in accordance with claim 1, wherein spooled pole segments are mounted alternatingly with non-spooled pole segments in direction of the slot width into a compact body, and where the pole pitch of adjacent pole segments is different.

7. Process for the production of a multiphase electric machine in accordance with claim 1, wherein the non-spooled pole segment, when being inserted, presses the coil into a defined form.

8. Process for the production of a multiphase electric machine in accordance with claim 1, wherein prior to impregnation said soft magnetic body is bandaged by a thin, fiber-reinforced ribbon.

9. Multiphase electric machine with a single pole winding, winding overhangs, at least one air gap, and a soft magnetic body, said soft magnetic body having slots and being composed of soft magnetic pole segments, said soft magnetic pole segments having surfaces that are bordering said slots, wherein said surfaces of said soft magnetic pole segments that are bordering said slots have grooves in which conductor wires are arranged.

10. Multiphase electric machine with a single pole winding in accordance with claim 1, wherein said soft magnetic pole segments are composed of stacked, grain-oriented sheets.

11. Multiphase electric machine with a single pole winding in accordance with claim 9, wherein said pole segments have oppositely disposed face sides that are bordering the winding overhangs, front elements with grooves are attached to said face sides of said pole segments that are bordering said winding overhangs, and said grooves of said front elements track the wire.

12. Multiphase electric machine with a single pole winding in accordance with claim 9, wherein said pole segments are arranged radially within said air gap, said pole segments have radially abutting inner ends said inner ends have contact surfaces into which locking pins are inserted.

13. Process for the production of a multiphase electric machine with a single pole winding and a soft magnetic body that is composed of pole segments in accordance with claim 9, wherein said pole coil, after spooling of the conductor wire, is pressed in a device into a defined form, thereby compressing the conductor wires which subsequently are lying in said slots.

14. Process for the production of a multiphase electric machine with a single pole winding in accordance with claim 9, wherein during spooling the wire of the first layer of a pole coil is arranged in grooves in said soft magnetic pole segment.

\* \* \* \* \*